Nov. 17, 1936.  L. J. DUVALL  2,061,225
PROPULSION MECHANISM FOR BICYCLES
Filed Nov. 6, 1934  2 Sheets-Sheet 1

Inventor
Lee J. Duvall

By Bacon & Thomas
Attorneys

Nov. 17, 1936.  L. J. DUVALL  2,061,225
PROPULSION MECHANISM FOR BICYCLES
Filed Nov. 6, 1934  2 Sheets-Sheet 2
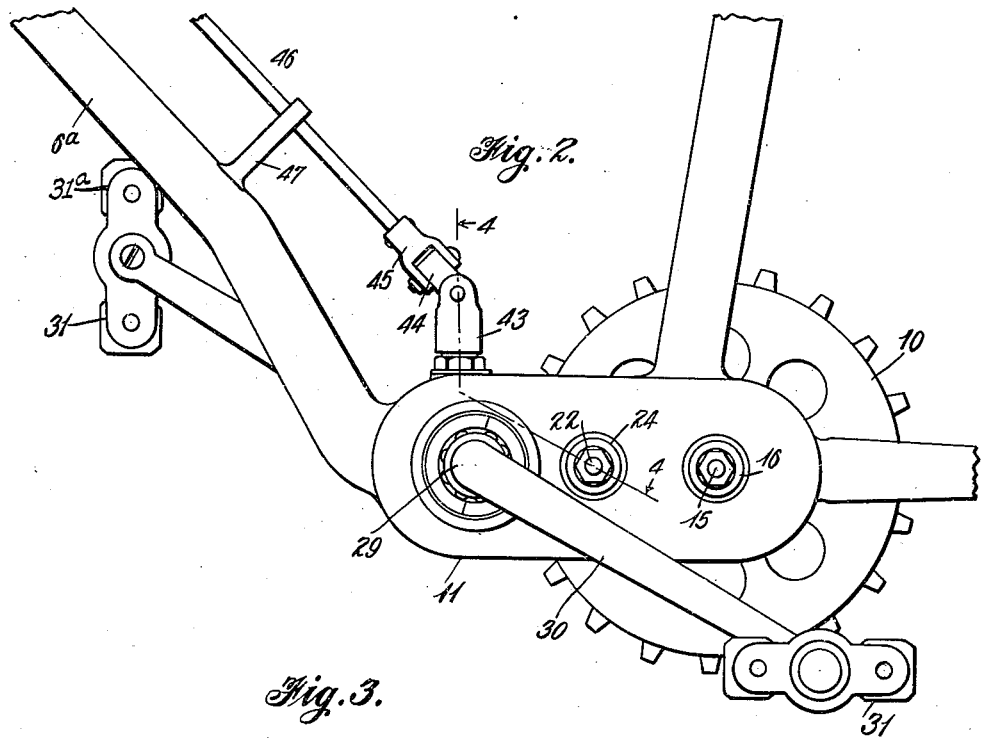
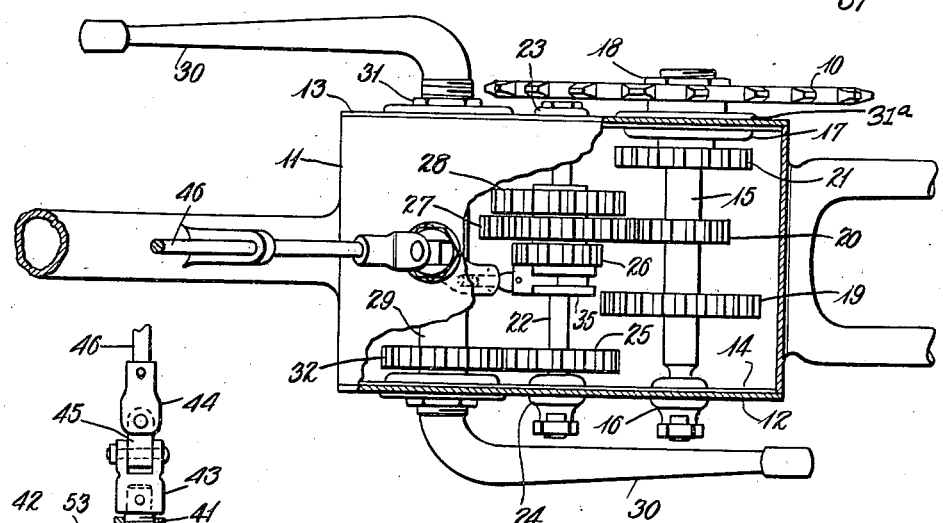
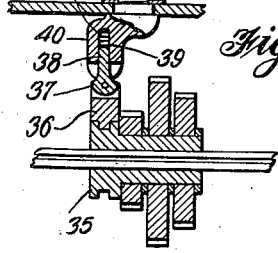
Inventor
Lee J. Duvall
By Bacon + Thomas
Attorneys Patented Nov. 17, 1936

2,061,225

UNITED STATES PATENT OFFICE 2,061,225

PROPULSION MECHANISM FOR BICYCLES

Lee J. Duvall, Louisville, Ky.

Application November 6, 1934, Serial No. 751,761

6 Claims. (Cl. 208—154)

This invention relates to new and useful improvements in propulsion mechanism for bicycles.

The primary object of the invention is to provide mechanism adapted for use on a bicycle of the manually propelled type and by means of which variable degrees of power may be obtained for a given amount of exertion, whereby steep grades and the like may be more easily negotiated.

A further important object of the invention is to provide a novel form of variable speed propulsion mechanism for a bicycle.

Still another important object of the invention is to provide novel controlling means for a variable speed transmission embodied in the drive of a bicycle.

Other objects and advantages of the invention will be apparent during the course of the following description:

In the accompanying drawings forming a part of this specification and in which like numerals are employed to designate like parts throughout the same:

Figure 2 is an enlarged, fragmentary, side elevational view of the propulsion mechanism disclosed in Figure 1 but taken on the opposite side of the bicycle;

Figure 3 is a fragmentary top plan view, partly broken away, of the propulsion mechanism;

Figure 4 is a fragmentary vertical sectional view of the propulsion mechanism and taken on line 4—4 of Figure 2.

Figure 1:
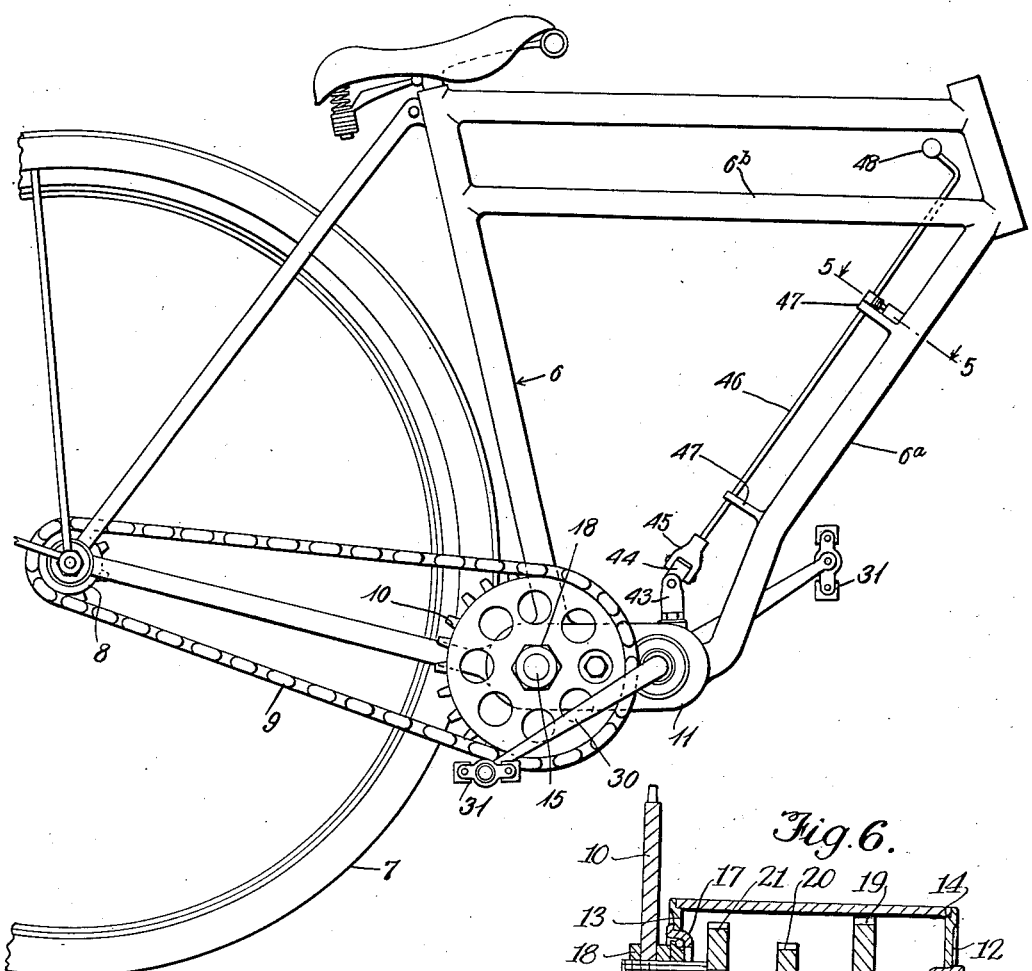
Figure 1 is a fragmentary side elevational view of a bicycle with the improved form of propulsion mechanism embodying this invention incorporated therein.

In the drawings, wherein for the purpose of illustration is shown a preferred embodiment of this invention, the numeral 6 designates in its entirety the frame of the bicycle. This frame is supported in the usual manner by two aligned wheels. The rear wheel 7, however, is the only one which is disclosed in the drawings. This rear wheel is provided with a conventional rear sprocket wheel 8 over which is trained the sprocket chain 9. A front sprocket wheel 10 is provided and has trained over the same the chain 9.

The central lower portion of the frame 6 has built therein a housing 11 which is of elongated formation in vertical longitudinal section. The opposite sides of this housing 11 are open and are adapted to be closed by the cover plates 12 and 13.

Figure 6:
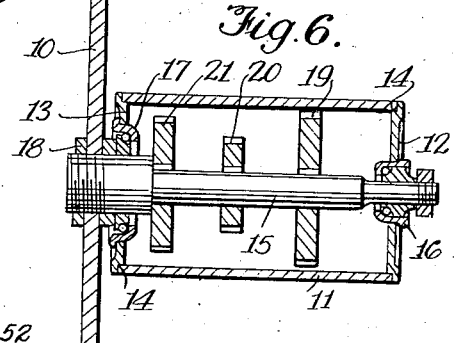
Figure 6 is a vertical section of the propulsion mechanism taken on shaft 15.

Each cover plate is provided with a flange 14 on its inner surface which engages the inner surface of the various walls forming the housing 11 for the purpose of centering the cover plates with respect to the housing. The thus centered cover plates are detachably retained in position by the bearings as clearly shown in Figure 6.

A sprocket shaft 15 is journaled in bearings 16 and 17 carried by the opposite cover plates 12 and 13, respectively. This sprocket shaft has suitably, detachably secured thereto, as by the nut 18, the forward sprocket wheel 10. Keyed or otherwise suitably secured to this sprocket shaft 15 are three spur gears 19, 20, and 21. These three gears are of different diameters and when driven will effect different speeds of rotation of sprocket shaft 15 and the forward sprocket wheel 10. A counter shaft 22, of square formation in cross-section, is journaled in the bearings 23 and 24 detachably carried by the cover plates 12 and 13, respectively. Fixed on the counter shaft 22, adjacent one end of the same, is a spur gear 25. Slidably mounted upon this counter shaft, to rotate therewith, is a compound gear unit which includes three different sized gears 26, 27, and 28. This compound gear unit is adapted to be shifted longitudinally of the counter shaft 22 for causing the gear 26 to mesh with the gear 19 for effecting a low speed drive. Shifting of the compound gear unit to cause the gear 28 to mesh with the gear 21 will effect a one-to-one or direct drive. Figure 3 discloses the gear 27 meshing with the gear 20. When these two gears are meshed, an over-drive is accomplished.

A driving or propelling shaft 29 is journaled in bearings 31 and 31a carried by the cover plates 12 and 13, respectively. This propelling shaft 29 has formed integrally therewith the pedal arms 30 adapted to have suitably secured thereto the conventional pedals 31. Fixed upon the driving or propelling shaft 29 to rotate therewith is a spur gear 32 which is arranged to constantly mesh with the spur gear 25 of the counter shaft 22. It will be appreciated, by inspecting Figure 3, that, due to the meshing of the gears 32 and 25, any rotation of the propelling shaft 29 will be accompanied by a rotation of the counter shaft 22. The gears 32 and 25 are of the same diameter, and for that reason the shafts 29 and 22 will be rotated at the same speed.

To effect shifting of the compound gear unit longitudinally of the shaft 22, this gear unit has formed thereon a grooved hub 35. Engaged in the groove of this hub is a fork 36. Pivotally connected to the fork 36 is a finger or arm 37 which has a reduced end 38 slidably received within a pocket or recess 39 formed in the crank or offset arm 40 of the shaft 41 which is journaled and detachably connected to the top wall 42 of the transmission housing 11. A spring 53 is received within the recess 39 to urge the arm 37 outwardly of the recess and functions to retain the fork 36 engaged with the hub 35. The upper end of the shaft 41 projects above the top of the housing and has detachably connected thereto one coupling member 43 of a universal joint. The second coupling member 44 of this joint is connected to the member 43 by means of a link 45. This second coupling member 44 is connected to a rod 46 which extends longitudinally of and in parallelism with the frame member 6a. Supporting arms 47 are carried by the frame member 6a to rotatably support the rod 46. The upper end of the rod 46 terminates in a manipulating handle 48. Adjacent this handle, the rod is journaled in the cross frame member 6b.

Figure 5:
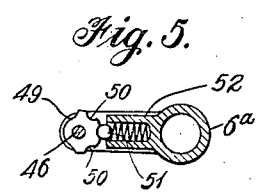
Figure 5 is a detailed sectional view taken on line 5—5 of Figure 1.

Disclosed in Figures 1 and 5 is a detent retaining mechanism which functions to hold the rod 46 in its three positions of adjustment. This mechanism includes a wheel 49 with the three notches 50 formed in the periphery thereof. A spring-pressed detent ball 51 is supported by the hollow boss 52. This ball 51 is received in the three different notches 50 to retain the rod 46 in its three different adjusted positions.

By rotating the rod 46 in opposite directions, the compound gear unit will be moved into its three operative positions to bring about either low, direct, or overdrive from the propelling shaft 29 to the sprocket shaft 15. By means of this variable propulsion mechanism, steep grades may be readily negotiated by means of the low speed drive. The direct or one-to-one drive will correspond with the speed which would be accomplished if the forward sprocket wheel 10 were directly connected to the propelling shaft 29. When the gear 27 is meshing with the gear 20, an over or greater than one-to-one drive is accomplished and will enable the operator of the bicycle to attain extremely high speeds.

It is to be understood that the form of this invention herewith shown and described is to be taken as a preferred example of the same. However, various changes may be made in the shape, size, and arrangement of parts without departing from the spirit of the invention or the scope of the subjoined claims.

Having thus described the invention, I claim:

1. Propulsion mechanism for bicycles comprising a bicycle frame, a driven wheel operatively connected to the frame, a variable speed gear set housed within the frame, a sprocket and chain drive between the gear set and the said wheel, a rotatable gear shifting means supported on the frame and terminating in an operating knob located at the top of the frame and a detent mechanism for holding said gear shifting means in different positions of rotation.

2. Propulsion mechanism for bicycles comprising a bicycle frame, a driven wheel operatively connected to the frame, a gear housing carried by the frame, variable speed gearing positioned within the housing and including a shiftable gear unit, a rotatable shifter shaft having an offset portion journaled in a wall of the housing, means for connecting said offset portion to the shiftable gear unit, and a driving connection between the driven wheel and said gearing.

3. Propulsion mechanism for bicycles comprising a bicycle frame, a gear housing carried by the frame, said gear housing including detachable cover plates forming the opposite side walls of the housing, a propelling shaft detachably journaled in said cover plates, a counter shaft detachably journaled in said cover plates, gearing constantly connecting said propelling shaft and said counter shaft, a driven shaft detachably journaled in said cover plates, a plurality of gear sets for driving the driven shaft from the counter shaft at a plurality of different speeds, and a driving sprocket carried by the driven shaft.

4. Propulsion mechanism for bicycles comprising a bicycle frame, a gear housing formed integrally with said frame, said gear housing having detachable side walls, variable speed gearing positioned within the housing and including a plurality of shafts detachably journaled in said removable walls of the housing and a shiftable compound gear unit, and a mechanism for effecting shifting movement of said compound gear unit, said shifting mechanism including a shaft journaled in a wall of the housing and including an offset arm within the housing, a shifter fork carried by the offset arm and operatively engaging the said compound gear unit, and means for rotating said shaft.

5. In combination, a bicycle frame, a variable speed transmission unit carried by the frame, said transmission unit including a shiftable compound gear element, a shaft journaled in a wall of said housing and including an arm operatively connected to said shiftable gear element, a rod supported for rotation on said frame, a universal joint connection between the rod and said shaft, and an operating knob carried by said rod.

6. Propulsion mechanism for bicycles comprising a variable speed gear unit including a compound shiftable gear element, a rotatable shaft including an offset arm operatively connected to said gear element to effect adjustment of the element upon rotation of the shaft, a rotatable control rod for operating said shaft, and detent mechanism for holding said rod in different positions of rotation.

LEE J. DUVALL.